Dec. 16, 1930.          I. W. FISHER          1,785,443
                        WEED CUTTER
                      Filed July 31, 1929
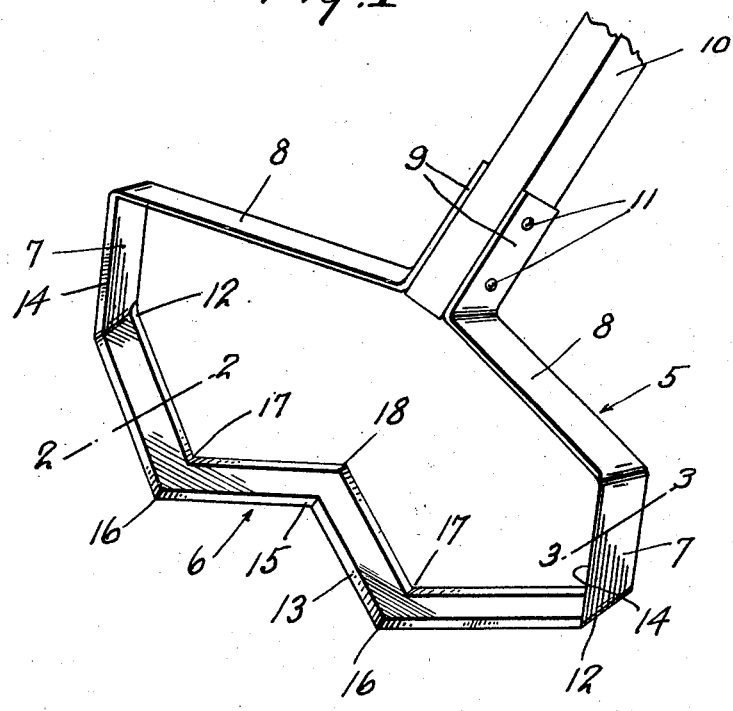
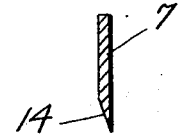
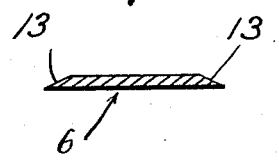
Inventor
Isaac W. Fisher
By Clarence A. O'Brien
                Attorney Patented Dec. 16, 1930

1,785,443

UNITED STATES PATENT OFFICE

ISAAC W. FISHER, OF LONG BEACH, CALIFORNIA

WEED CUTTER

Application filed July 31, 1929. Serial No. 382,574.

This invention relates to weed cutters, and has more particular reference to a hand tool especially adapted for use as a garden implement, the construction being such as to render the tool especially desirable for cutting weeds, shrubbery, and other such growths.

A very important object of the invention is to provide a weed cutter wherein the main blade has its opposite cutting edges provided with substantially V-shaped recesses, one cutting edge of the blade being provided with a single recess, and the other edge of the blade being provided with a pair of such recesses, there being one of such recesses disposed to each side of the first mentioned V-shaped recess, thus providing the cutting edges of the blades with sharpened ground penetrating teeth.

Another very important object of the invention is to provide a weed cutter of this nature, which is simple in construction, strong, durable, compact, inexpensive in construction, reliable, practical, efficient in use and operation, and otherwise well adapted for the purpose designed.

Other objects and advantages of the invention will become apparent during a study of the following description, taken in connection with the accompanying drawings, wherein:

Figure 1 is a perspective view of a weed cutter constructed in accordance with the present invention.

Figure 2 is a transverse vertical sectional view taken substantially on line 2—2 of Figure 1.

Figure 3 is a transverse horizontal sectional view taken substantially on line 3—3 of Figure 1.

With reference more in detail to the drawings, it will be seen that the weed cutter comprises an elongated strip of metal or other suitable strong and durable material designated generally by the reference character 5, and that this strip is so bent as to provide a main blade designated generally by the reference character 6, rearwardly extending end blades 7—7, the free ends of which end blades 7 are bent angularly to provide rearwardly extending inwardly directed arm portions 8—8, which arm portions 8—8 have their inner ends bent angularly to provide a pair of spaced parallel attaching portions or flanges 9—9. Each of the attaching portions 9 are provided with alined spaced apertures, and one end of a handle member 10 is adapted to be disposed between the attaching portions 9—9 and rivets or other like fastening elements 11 extend transversely through the attaching portions 9—9, through the apertures of said portions and through the said ends of the handle member 10 as clearly shown to advantage in Figure 1.

The end blades 7—7 as before mentioned, extend rearwardly from the opposite ends of the main blade 6, the strips 5 being bent on spaced obliquely extending lines 12—12, so that the main blade 6 extends substantially obliquely to the end blades 7.

The main blade 6 has its opposite longitudinal edges bevelled as at 13 to provide sharpened cutting edges for the blades, while The end blades 7—7 as before mentioned, edge thereof as at 14 to provide a cutting edge therefor, said cutting edge 14 forming a continuation of one of the cutting edges of the main blade 6.

The main blade 6 has one cutting edge thereof provided with a substantially V-shaped recess 15 to provide spaced sharpened ground engaging teeth 16, while the other cutting edge of the main blade 6 is provided with a pair of V-shaped recesses 17 at each side of the first mentioned V-shaped recess 15, and forming on the last mentioned edge of the main blade a ground engaging tooth 18 intermediate the ends of said main blade 6.

From the foregoing, it will be seen that the tool may be used for cutting the weeds or other undesirable shrubbery, and at the same time, the tool may be used for disturbing the ground in order to get at the weeds at their roots for cutting the weeds at the roots to insure the destruction of the weeds.

From the foregoing it will be also seen that the device is comparatively simple in construction, yet strong and durable and inexpensive and that the same is well adapted to the purpose for which it is designed.

Even though I have herein shown and described the preferred embodiment of my invention, it is to be understood that the same is susceptible to changes fully comprehended by the spirit of the invention, and the scope of the appended claim.

Having thus described my invention, what I wish to claim as new is:

In a hand tool of the class described, an oblique main blade having its opposite edges cut in a zig-zag fashion to provide on one of said edges a tooth arranged substantially in line with the transverse center line of said blade, and a pair of teeth at the other of said edges, one to each side of said transverse center line of the main blade, end blades extending upwardly at an angle to said main blade and obliquely with respect to said main blade, said end blades respectively being sharpened on one edge only, and said end blades adjacent their free ends terminating in inwardly directed end portions provided with means for securing therebetween one end of a handle.

In testimony whereof I affix my signature.

ISAAC W. FISHER.